(12) United States Patent
Taylor

(10) Patent No.: US 6,209,004 B1
(45) Date of Patent: *Mar. 27, 2001

(54) METHOD AND SYSTEM FOR GENERATING AND DISTRIBUTING DOCUMENT SETS USING A RELATIONAL DATABASE

(75) Inventor: Colin R. Taylor, New York, NY (US)

(73) Assignee: Taylor Microtechnology Inc., New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/704,265

(22) Filed: Aug. 28, 1996

Related U.S. Application Data

(60) Provisional application No. 60/003,122, filed on Sep. 1, 1995.

(51) Int. Cl.[7] .................................................. G06F 15/00
(52) U.S. Cl. ............................................................ 707/500
(58) Field of Search .................................. 707/500, 200, 707/102, 203, 205, 511, 513, 100–104, 526, 501, 515, 530

(56) References Cited

U.S. PATENT DOCUMENTS

| | | | |
|---|---|---|---|
| 5,267,155 | * 11/1993 | Buchanan et al. | 364/419.14 |
| 5,666,490 | * 9/1997 | Gillings et al. | 395/200.68 |
| 5,749,083 | * 5/1998 | Koda et al. | 707/530 |
| 5,799,325 | * 8/1998 | Rivette et al. | 707/500 |

OTHER PUBLICATIONS

Person et al., Using Word Version 6 for Windows, Que, pp. 167 & 175, Jan. 1993.*

* cited by examiner

*Primary Examiner*—Joseph H. Feild
*Assistant Examiner*—Alford W Kindred
(74) *Attorney, Agent, or Firm*—Helfgott & Karas, P.C.

(57) ABSTRACT

A method and system use a processor, video display and relational database to format, define, generate, maintain, distribute and analyze sets of related documents. The process stores document-specific data in a relational database. A computer-controlled video display guides the document author through the creation and maintenance of the documents, while enforcing the document structure and dependency rules. The creation of documents that relate to activities that require multiple actions at specified time points is driven by a time/action electronic matrix that serves as a central control mechanism for each document set; an example is a document set for use in clinical research studies of drugs. Document sets may be electronically transferred between computers by initial storage at each computer of assembly instructions and formatting information and content common to all documents in the document set, and subsequently by transmitting only document-specific information for each document, with assembly of the document being performed by the receiving computer.

8 Claims, 6 Drawing Sheets

FIG. 6

CLINICAL STUDY FLOW CHART

| STAGES | PRETHERAPY | | THERAPY | | | | | POST THERAPY | |
|---|---|---|---|---|---|---|---|---|---|
| PERIODS | Screening/Washout | SSB Placebo Run-in | Double Blind Colpopeia | | | | | Follow-up | |
| TIME POINTS (end of WEEK) | -4 to -1 | -2 to -1 | 0 | 1 | 2 | 3 | 4 | ≥1 to ≤2 | >2 to ≤4 |
| DOSING GROUPS | | | | | | | | | |
| Zalopine (mg qd) | 0 | 0 | 0 | 5 mg qd | 10 mg qd | 15 mg qd | 20 mg qd | 20 mg qd | 0 |
| Placebo (mg qd) | 0 | 0 | 0 | 0 | 0 | 0 | 0 | 0 | 0 |
| ENTRY/RETENTION CRITERIA | | | | | | | | | |
| Informed Consent | x | | | | | | | | |
| Physical Exam | x Footnote 1 | | | | | | | | |
| Entrance Criteria Check | x | | | | | | | | |
| Hazardous AE or Efficacy | x | x | x | x | x | x | x | | |
| Sys BP >190/Dias BP >114mmHg | x | x | | | | | | | |
| Diastolic BP <90 mmHg | x | x | | | | | | | |
| EFFICACY - CLINICAL | | | | | | | | | |
| Blood Pressure | x Footnote 2 | x | x | x | x | x | x | x Footnote 3 | x |
| EFFICACY - LABORATORY | | | | | | | | | |
| No Lab Efficacy | | | | | | | | | |
| SAFETY - CLINICAL | | | | | | | | | |
| Adverse Events | x | x Footnote 4 | x | x | x | x | x | x | x |
| Heart Rate | x | x | x | x | x | x | x | x Footnote 5 | x |
| SAFETY - LABORATORY | | | | | | | | | |
| Chem/Hem/Urine | x | | x | | | | x | x | |
| PHARMACOKINETICS | | | | | | | | | |
| Plasma | | | | | | | | x Footnote 6 | |
| OTHER | | | | | | | | | |
| No Other Parameters | | | | | | | | | |

Footnotes:

1. Complete Physical Examination, including height and funduscopic evaluation.
2. BP will be measured pre-dose and 2 hours post-dose at this and all subsequent visits.
3. In addition to pre-dose and 2 hours post-dose, BP will be measured at 4, 8, 12, & 24 hours post-dose.
4. Heart Rate will be measured pre-dose and 2 hours post-dose at this and all subsequent visits.
5. In addition to pre-dose and 2 hours post-dose, Heart Rate will be measured at 4, 8, 12, & 24 hours post-dose.
6. Plasma samples (from a 4 ml whole blood sample) will be obtained pre-dose, and 1, 2, 4, 8, 12 & 24 hours post-dose.

METHOD AND SYSTEM FOR GENERATING AND DISTRIBUTING DOCUMENT SETS USING A RELATIONAL DATABASE

This application claims the benefit of U.S. Provisional Application No. 60/003,122, filed on Sep. 1, 1995.

BACKGROUND OF THE INVENTION

1. Field of the Invention

The present invention relates to a method and system for creating and distributing sets of related documents.

Traditionally, documents are considered as discrete paper records representing textual or other information. In recent years, a broader definition of documents has been adopted that incorporates storage of the underlying document information in electronic form. That can include graphic or other information displays derived from separate computer programs and exported into a computer word processor program and stored as a single computer file in word processor format. Many documents are functionally linked to other documents that deal with a particular business or academic function and can be referred to as 'Document Sets'.

Conventional word processor documents store document information in a form fundamentally different from the form used for storage of much of the other data related to the documents (e.g., other data on a business project). Accordingly, integration of the information contained in these disparate documents, Document Sets and databases is difficult, and frequently involves repeated entry of the same information into multiple data storage devices. The Author of a document generated by a word processor does not have easy guidance on the format and content requirements of a given document type. The Author also lacks electronic access to relevant information contained in other documents or databases. Electronic transmission of a document (e.g., via computer networks) is performed by transmission of the entire electronic file for the document, regardless of whether some components of the electronic file are already present at the computer site receiving the document.

For example, Clinical Research Studies of a new drug for use in human disease require a Document Set for each Clinical Study. Each such Clinical Study requires a number of 'documents' that are primarily text-based descriptions of various Clinical Study features, such as design and implementation agreements, instructions, and records of implementation of the Clinical Study. The central document for a Clinical Study is the 'Protocol' which is a written description of how the Clinical Study will be conducted by an Investigator studying the drug in normal volunteers or patients with disease. In addition, other documents related to Clinical Studies are required. Documents in Clinical Study Document Sets are largely based on the underlying design of the Clinical Study, as represented by a series of actions performed at specified times.

It is therefore desirable to generate Document Sets in a manner that facilitates document creation, integration with other databases, efficient transfer of documents and related files between computers, linkage of related documents so as to access information from a common store, and enforcement of standards to be applied to such documents.

2. Description of the Prior Art

Documents are conventionally generated using either a typewriter or a computer word processor, but these methods have the disadvantage that they do not provide, or have limited capacity for, the following:

Relational Database: Storage within a relational database of document data, structural information, rules and Dependencies, so as to permit linking of comparable data residing in different sections of an individual document or in different documents, sophisticated searching, integration and analysis of the data, and analysis of data across multiple Document Sets. In addition, storage of document data in a relational database facilitates exchange of information between non-document relational databases that contain information functionally related to the information in the documents.

Time/Action Electronic Matrix: A central control mechanism for Document Sets based on an electronic matrix of time periods and associated actions.

Enhanced Electronic dissemination of Documents: Transfer of a document between computers by confining transmission to those portions of a document that are document-specific—i.e., those portions that are not shared by all other documents of the particular type.

Automatic regeneration of Dependent documents or document components: Dependency of a document or document section implies that it requires updating when a given data item shared within or across documents is changed.

Automatic updating and reconciliation of Data: Data from different documents within a Document Set or across multiple Document Sets can be automatically updated and reconciled.

Enforcement of Format and Content Requirements: Computer-controlled mechanism for avoiding document format violations and document information omissions.

For Clinical Research Studies, the following document types share linked information:

Clinical Study Protocol.

Investigator-Related Documents: Investigator Protocol Approval Forms, Correspondence, Telephone Contact Form, Site Visit Report Forms, Investigator Check Lists, Investigator Instructions.

Patient Documents: Patient Instructions, Documents to record Other Patient Data.

Regulatory Authority Documents: Clinical Study Summary; Integrated Summary of Safety; Integrated Summary of Efficacy; Other IND and NDA documents; Correspondence.

Serious Adverse Event (SAE) Documents: SAE Protocol Inventory Form, SAE Patient Report Form.

Budget Documents: Generic Budget, Investigator-specific Budget.

Informed Consent Form (ICF) Documents: Generic and Investigator-specific ICFs.

Other Internal Sponsor Documents: Memoranda; Internal Check Lists; Internal Approval Forms (for Protocol, ICF, budget, Case Report Form, drug supply request).

Other Document Types: Case Report Order Form, Drug Supply Order Form, Sample Size Estimation Form.

A 'Sponsor' of a Clinical Study is the organization responsible for filing the Clinical Study with the Food and Drug Administration ('FDA') and is normally a pharmaceutical company. Most Sponsors use a word processor to write Protocols and other documents required in a Clinical Study, frequently by copying sections of previous documents and editing these. The 'Author' (i.e., the person writing the Protocol) is not forced during Protocol writing to address all of the key items in writing a Protocol, so that major omissions and errors may be frequent. Even though a Sponsor may have a 'standard format' for Protocols, this may not be followed by Authors—so that the task of those reviewing and approving the Protocol is more difficult. Photocopies of the Protocol are normally distributed for internal review and for hand-written comments to be written on the copy. The Protocol exists as a word processing file that limits search capabilities (e.g., dosage used across Protocols). Normally a separate form containing key Protocol items for the Sponsor's Serious Adverse Event database is hand-generated and these data are then entered into a separate computer database. Many disparate Clinical Study databases exist in pharmaceutical companies and integration of these databases has become a significant issue with the pharmaceutical industry and FDA—with significant medico-legal and regulatory implications.

SUMMARY OF THE INVENTION

It is an object of the present invention to provide enhanced methods and systems for creating Document Sets containing documents that share common information, and for providing more efficient electronic transfer of documents and other electronic files between computers.

In accordance with a preferred embodiment of the present invention, a method and system are used to format, define, generate, maintain, distribute and analyze documents. Document-specific data are stored in a relational database which allows dynamic two-way data exchange with document templates containing information common to all documents of a specific document type; a complete document is assembled by combining the data in the template and relational database.

In accordance with another embodiment of the present invention, Document Sets (groups of documents belonging to sets of related document types that share common information) are generated together and derive common information from a common data store.

In accordance with a further embodiment of the present invention, the creation of documents that relate to activities that require multiple actions at specified time points is driven by a unique Time/Action Electronic Matrix that serves as a central control mechanism for such a document set.

In another embodiment of the present invention, documents may be electronically transferred between computers by initial storage at each computer of assembly instructions and formatting information and content common to all documents in the document set, and subsequently transmitting only document-specific information for each document, with assembly of the document being performed by a receiving computer.

In a preferred embodiment of the present invention, the document data reside in a computer relational database that permits sophisticated information searching and creation of additional documents or reports. The document structure can be stored either in specialized word processor templates or as templates residing in the relational database. The relational database also stores Document Dependencies that determine which data items and documents are to be linked. The relational database also contains examples of generic text sections and text sections from other similar documents; these text sections can be selected by the Author and inserted into an active document and edited if necessary.

In a further preferred embodiment of the present invention, a template is initially generated for each document type and applied by all Authors. Each company can have a company-specific template with customized order of sections, level of section detail, 'boilerplate' texts, etc. In addition, an individual project team can use a team-specific template. For example, a clinical research program in angina pectoris might routinely include a section on treadmill exercise testing.

In accordance with a preferred method incorporating the principles of the present invention, each Author is prompted to input the required information that is stored in a computer relational database. This database is used to generate the formatted documents, and to allow search capabilities of the information stored in the database. The document structure, data and text are stored. In addition, information on Dependencies between different documents is stored and this permits automatic regeneration of all Dependent documents or components. Each user (Author or reviewer) may be assigned a unique password that gives the user access to a specific level of permission for review, editing or deletion of a document. Different levels of password protection may be provided with different levels of access (from read-only to full editing and deletion privileges). Information shared between different sections of a document or between different documents is automatically maintained. In addition, additional information (e.g., on previous Protocols or on competitive drugs) can be linked to a document, and thus can be searched and incorporated in the document by the Author.

In accordance with a further preferred method incorporating the principles of the present invention, the company or other organization using the invention can specify rules for completion of individual sections or rules linking different sections; if so, error checks may be performed to make sure that these rules are being followed. Automatic consistency checking and error checking (including spell checking) can be provided. Revisions are tracked and individual versions may be designated as final and not editable.

A system incorporating the principles of the present invention automatically updates all electronically linked sections in the document or in other documents in the Document Set when an existing data item in a document is edited, Audit trails, different levels of access (editing, read only, etc.), and 'frozen' archive copies of different versions may also be made available. Word processing computer files of existing documents not created by the method of the present invention may be converted to data files in the format used in the system of the present invention so that all examples of a Document Set will be in the same database format.

Further features of the present invention are a Time/Action Electronic Matrix document controller, and a method for more effective electronic transmission of documents or other electronic files:

Time/Action Electronic Matrix:

In accordance with further embodiments of the present invention, Document Sets are generated using, as a central control mechanism, a Time/Action Electronic Matrix representing time (the period during which actions take place) and actions (evaluations, interventions or other actions taken or performed during the project to which the Document Set relates). The full data in the Time/Action Electronic Matrix may be visually represented in a 'Flow Chart' table that can be incorporated directly into another document. The various documents in the Document Set utilize the information in this matrix. The matrix is represented as a set of electronic data locations. The intersection of each time-point/action pair is represented by a 'cell'. The cell indicates whether or not the action is to be performed at the specified time point. When the Time/Action Electronic Matrix has been designed by the Author, the Dependent components of the various documents in the Document Set (i.e., those text sections which are dependent on the entered matrix data) are automatically available. The document text sections are independently accessed by the Author for insertion of the remaining text.

Electronic Transmission of Documents or Other Files:

According to a further embodiment of the present invention, data storage in a relational database can be used to provide a more efficient method of transmitting files electronically by computer networks or by physical transfer of copies residing in electronic storage media. Computer networks such as the Internet (a publicly available worldwide network of computers) and Intranets (organization-specific proprietary computer networks that may also access the Internet) have a significant and increasing problem of 'bandwidth' creating a bottleneck in the speed of data transmission. Other workers have developed methods for compacting the information within an individual computer file (e.g., a word processor file) but have not addressed the possibility of eliminating redundant information across documents of a particular document type. Documents of a specific document type may all contain common formatting information or common text sections that substantially increase the size of the electronic document file. The example of a document provided as Protocol Document Listing I has file sizes of 66 kilobytes (KB) as a conventional Microsoft Word file, 26 KB as a simple text (ASCII) file, and 16 KB as a file confined to the document-specific components of the file (i.e., eliminating both formatting information and text segments shared by the Protocol document type). Even greater file size savings can be obtained by eliminating redundant information stored at multiple document locations at which shared information is placed (i.e., common information stored in the document database and inserted in multiple places within the document). Utilizing the present invention, the document-specific information stored in the relational database can also be stored and transmitted in a more compact data format using the C++ computer software classes that can be used in the method and system of the present invention to link the data in the relational database to the word processor templates that will generate the complete documents.

In accordance with the present invention, similar methods can be used to enhance the efficiency of transfer of non-document electronic files that belong to a particular file type that shares common formatting or content between all files of that type. The standard formatting and content for a particular file type can be transmitted to a remote computer on a single occasion, and thereafter this computer will be able to assemble a file of that type by combining the file-specific information subsequently transmitted with the standard format and content information already stored in the computer for the file type. Accordingly, major reductions in data transmission requirements can be achieved using the present invention.

The aforementioned objects, features and advantages of the present invention will become more apparent from the following detailed description, taken in conjunction with the accompanying drawings in which:

BRIEF DESCRIPTION OF THE DRAWINGS

FIG. 6 is a Clinical Study Flow Chart showing the results of using the method and system embodying the present invention.

DETAILED DESCRIPTION OF THE PREFERRED EMBODIMENTS

Figure 1:
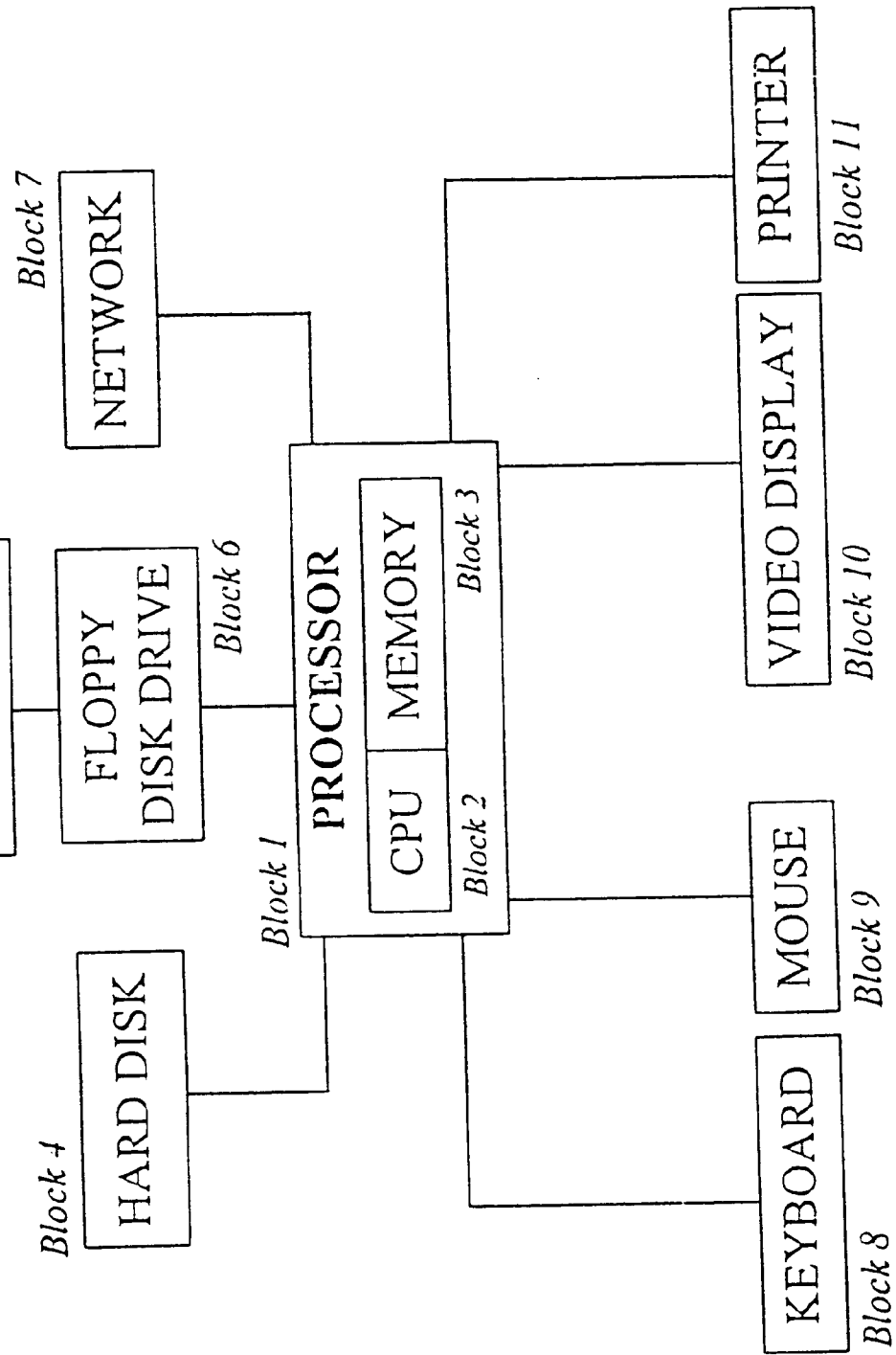
FIG. 1 is a block diagram of the hardware components of a preferred embodiment of the system according to the present invention.

As previously mentioned, Clinical Study documents are necessary features of investigations of the effects of drugs or other therapeutic modalities in the treatment or evaluation of human disease. The method and system according to the present invention generates Clinical Study documents and utilizes the information in such documents during the execution, analysis and reporting phase of clinical investigation.

Referring to the drawings:

FIG. 1 is a block diagram of the hardware components of a preferred embodiment of the system according to the present invention. In this figure, Block 1 is a processor such as a computer microprocessor. Block 2 and Block 3, respectively, represent the CPU and Memory components of the microprocessor in Block 1. Block 4 is a computer hard disk. Block 5 is a computer floppy disk. Block 6 is a computer floppy disk drive. Block 7 is a network that may optionally contain some software components of the invention. Block 8 is a keyboard for data entry. Block 9 is a computer mouse. Block 10 is a video display device. Block 11 is a printer for paper copies of documents.

Figure 2:
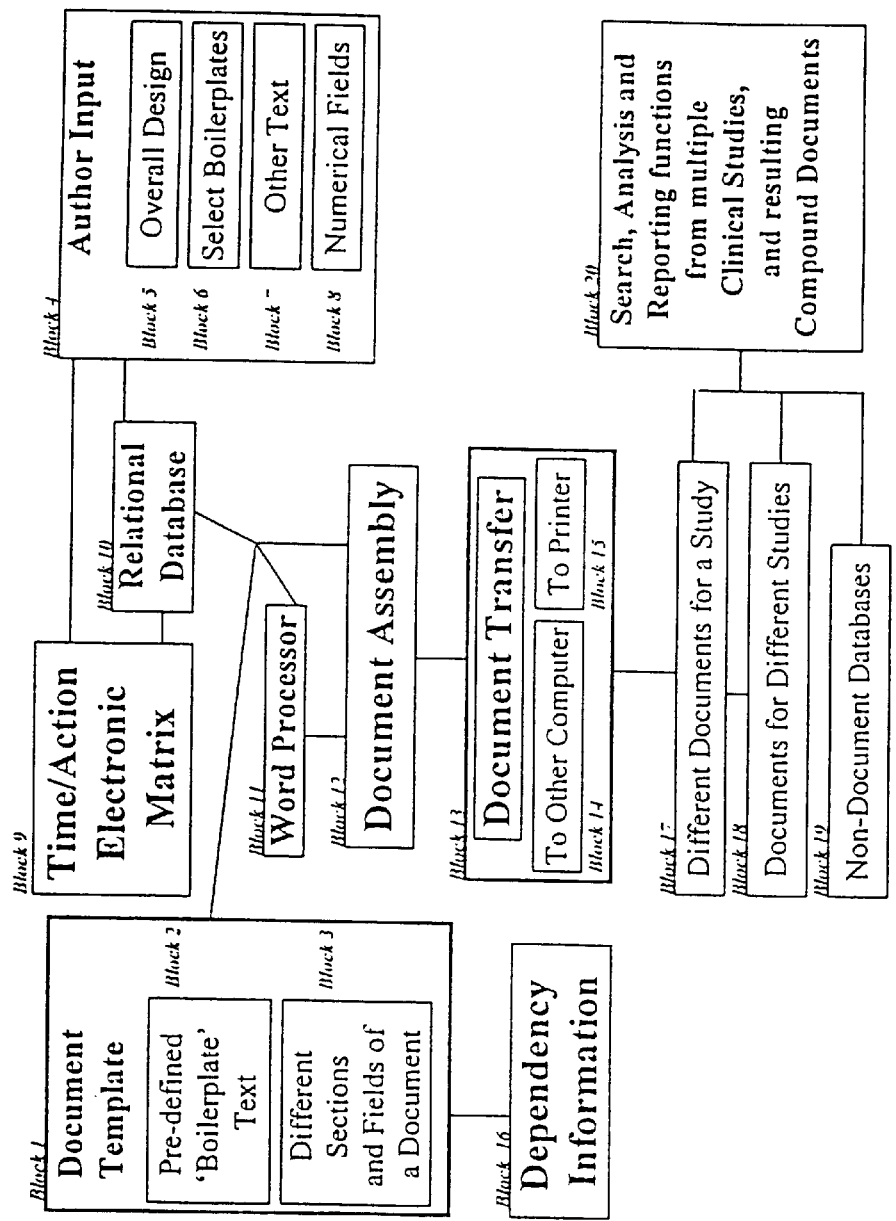
FIG. 2 is a block diagram of the main functional components of a preferred embodiment of the present invention.

FIG. 2 is a block diagram of the main functional components of a preferred embodiment of the present invention.

Block 1 represents a document template that defines a preferred document format and standard text of a specific Sponsor, that is located either in a relational database or in word processor template file, and in which reside:

Block 2 which represents 'Boilerplate' text that is used in most documents. Such text can be required to be used 'as is' in the document (and this may be achieved by incorporation within a word processor template). It can also be used as default text that can be optionally selected by the Author.

Block 3 which represents the different sections and fields of a given document.

Block 4 represents the input elicited from the document Author, and which includes:

Block 5 which represents the overall design of the Clinical Study elicited from the Author via the Time/Action Electronic Matrix.

Block 6 which represents Author selection of 'Boilerplate' text.

Block 7 which represents other text provided by the Author.

Block 8 which represents numerical data provided by the Author.

Block 9 represents a Time/Action Electronic Matrix that drives the Clinical Study design, and is associated with a graphical display on the screen of the video display device.

Block 10 represents the relational database for an individual document and which contains tables containing various functional components, including the Time/Action Electronic Matrix data and other information provided by the Author.

Block 11 represents a word processor computer software program that may participate with the relational database in two-way exchange of information, and may also be used to control assembly and printing of a completed document.

Block 12 represents the document assembly process whereby the data in the relational database is combined with the document template information. Document assembly may be done either by the word processor in Block 11 (by combining the document template stored in word processor format with the Author-entered information stored in the relational database), or from special software used in the present invention that can combine template and Author-entered information to provide either direct printout of the document, or generation of a Rich Text Format (RTF) file that can be used by a word processor to print the document.

Block 13 represents the transfer of an assembled document to another device.

Block 14 represents the transfer of a document to another computer using the special electronic transfer process used in the present invention.

Block 15 represents the transfer of document information to a printing device that can generate a hard copy of the document.

Block 16 represents the Dependency information stored with the Clinical Study template, and which determines which documents or document sections share common data.

Block 17 represents different linked documents for an individual Clinical Study.

Block 18 represents linked documents for different Clinical Studies.

Block 19 represents non-document databases that can be linked with documents generated using the present invention. Examples include a patient database of results obtained during the Clinical Study, and a commercial database of marketed drugs such as the Physicians' Desk Reference (Medical Economics Data Production Company).

Block 20 represents the search, analysis and reporting functions for multiple Clinical Studies, and the resulting compound documents.

Figure 3:
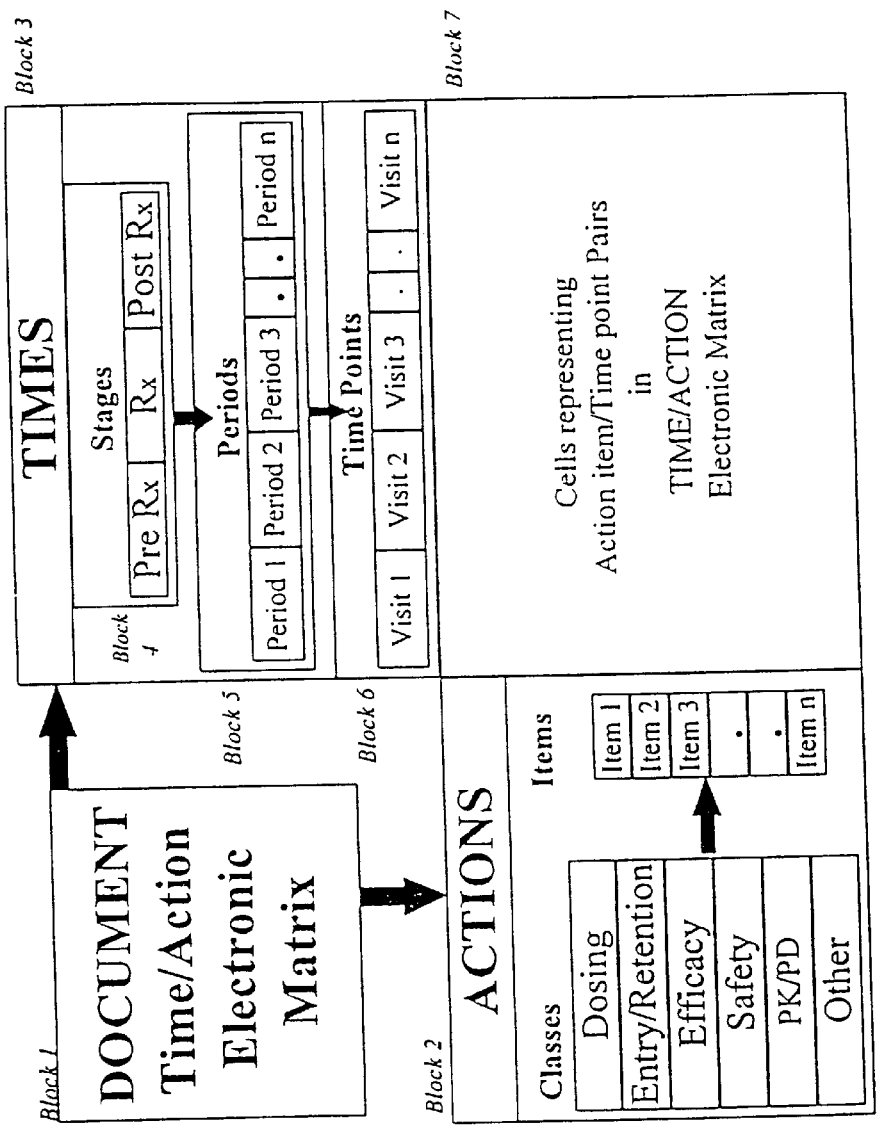
FIG. 3 is a block diagram of a design engine used for a Clinical Study according to the method and system of a preferred embodiment of the present invention.

FIG. 3 is a block diagram of a design engine used for a Clinical Study according to the method and system of a preferred embodiment of the present invention.

Block 1 represents the Time/Action Electronic Matrix that drives the Clinical Study design, and which has the following two axes:

Block 2 which represents the Actions axis, and which contains Classes of actions such as criteria for Dosing, Entry/Retention of patients, efficacy assessment, safety assessment, pharmacokinetic/pharmacodynamic assessment (PK/PD) and other (miscellaneous) actions. Each Class of actions contains a number of Items that fall within the Class.

Block 3 which represents the Times axis, and which contains Stages (Block 4), each of which contains one or more Periods (Block 5), each of which contains one or more patient Visits (Block 6).

Block 7 which represents cells in the matrix that represent Time/Action pairs, and which represent which actions are to be performed at a specific time.

An example of Clinical Study document utilizing the techniques of FIG. 3 will be subsequently reviewed.

Figure 4:
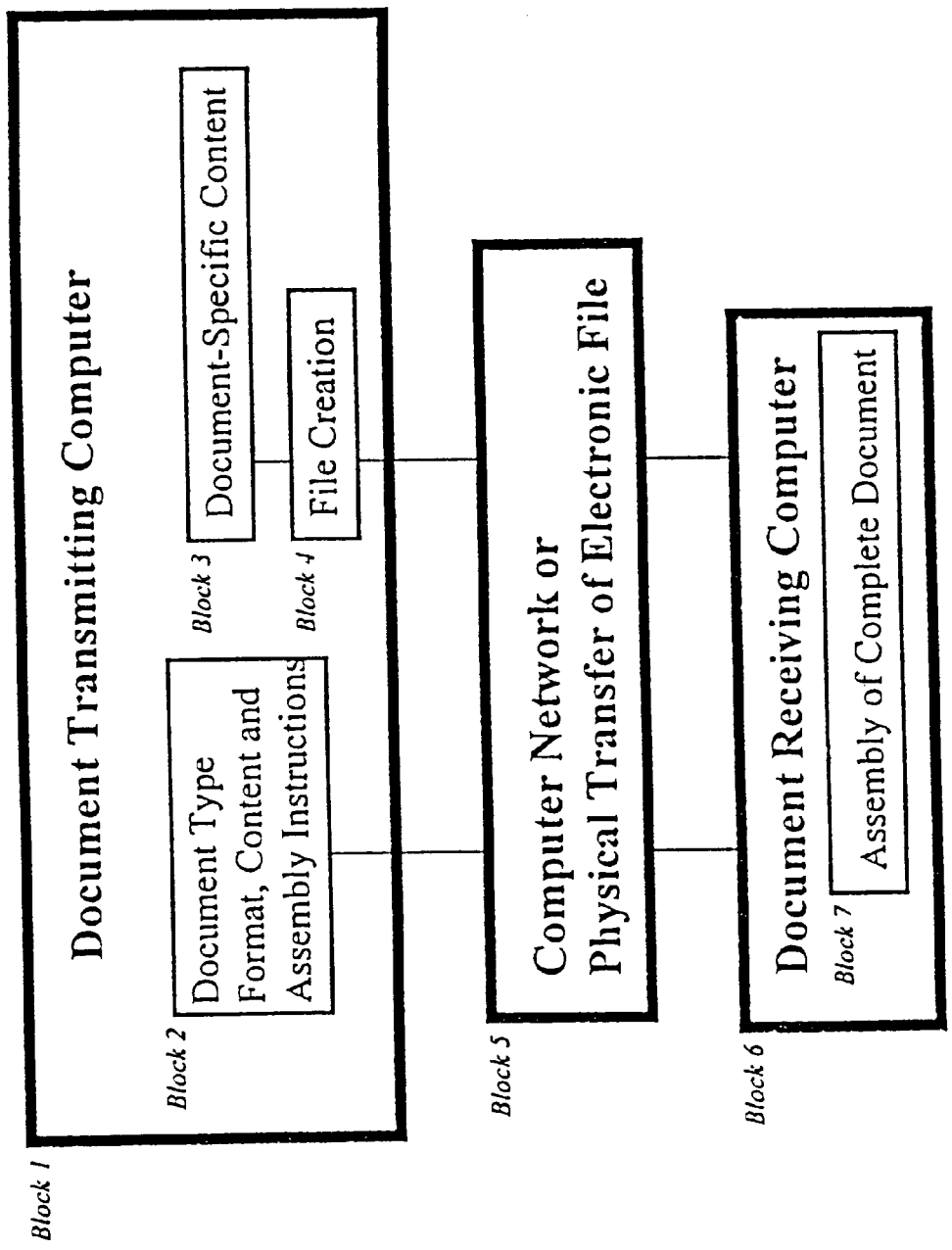
FIG. 4 is a block diagram for electronic transmission of documents according to the method and system of a preferred embodiment of the present invention.

FIG. 4 is a block diagram for transmitting a document between computers according to the method and system of a preferred embodiment of the present invention.

Block 1 represents a computer that transmits a document to a separate computer.

Block 2 represents the document assembly instructions, and the format and content information applicable to all documents of a particular document type.

Block 3 represents the document-specific content for an individual document stored in the relational database.

Block 4 represents the process whereby an electronic file is created to store the document-specific content in a condensed format using well known computer principles and techniques.

Block 5 represents a computer network or a physical or other standard computer mechanism for transferring an electronic file from one computer to another computer.

Block 6 represents a computer that receives a document transmitted from a separate computer.

Block 7 represents a process whereby the data represented in Blocks 2 and 4 are combined to assemble a complete document identical to that assembled in the computer that transmitted the data.

Figure 5:
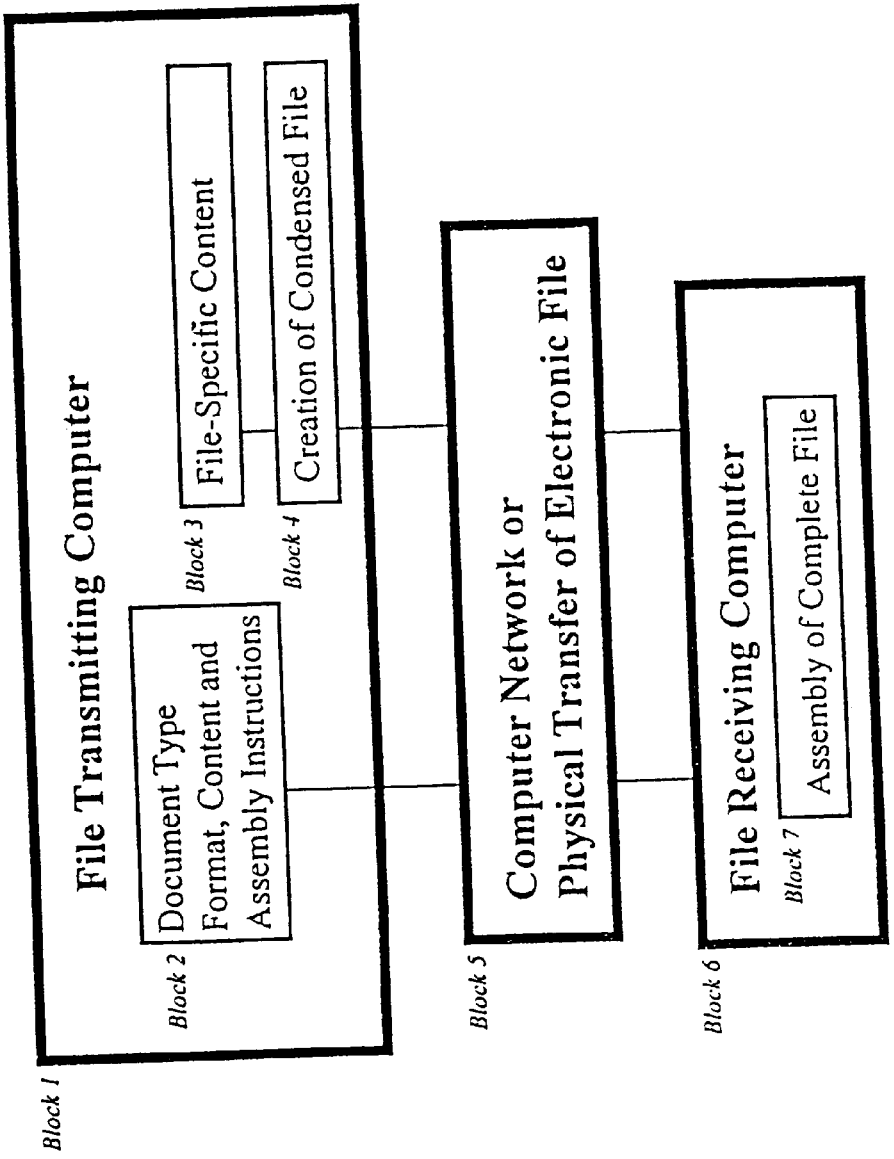
FIG. 5 is a block diagram for electronic transmission of other file types according to the method and system of a preferred embodiment of the present invention.

FIG. 5 is a block diagram for transmitting between computers an electronic file that contains formatting information or content shared among files of a specific file type according to the method and system of a preferred embodiment of the present invention. An example of such a file is one containing the assembly instructions for a document.

Block 1 represents a computer that transmits a file to a separate computer.

Block 2 represents the file assembly instructions, and the format and content information applicable to all files of a particular file type.

Block 3 represents the file-specific content for an individual file. Such a file may store data using any of a variety of standard computer principles and techniques.

Block 4 represents the process whereby an electronic file is created to store the file-specific content in a condensed format using well known computer principles and techniques.

Block 5 represents a computer network or a physical or other standard computer mechanism for transferring an electronic file from one computer to another computer.

Block 6 represents a computer that receives a file transmitted from a separate computer.

Block 7 represents a process whereby the data represented in Blocks 2 and 4 are combined to assemble a complete file identical to that stored in the computer that transmitted the data.

FIG. 6 is a Clinical Study Flow Chart that is a visual representation of a Time/Action Electronic Matrix representing time (top three rows) and actions (left hand column). The time axis represents the duration during which a patient participates in the Clinical Study, and is divided into Stages, that are divided into Periods, that are divided into Visits. The actions axis includes various action groups (drug dosing; criteria for entering or retaining a patient in the study; assessment of the clinical and laboratory efficacy of the drugs; assessment of the clinical and laboratory safety of the drugs; pharmacokinetic assessments; and other assessments) and each action group may include zero, one, or multiple action items. The 'cell' located at each time/action intersection indicates whether or not the specified action is to be performed at the specified time. As an example, the action item "Physical Exam" in the Entry/Retention Criteria action group is to be performed at a single Visit (Visit -4), and Footnote 1 explains that this action is to be a "Complete Physical Examination, including height, weight and funduscopic examination". The 'Flow Chart' table can be incorporated directly into another document such as the Protocol for the Clinical Study.

It is clear that the interaction between the various components of the above described blocks of the block diagrams follows well known computer principles and techniques and need not be further described in order to avoid unnecessarily complicating the drawings and specification. Thus, the computer or computers may be IBM™PC-compatible personal computers using an Intel microprocessor of the 80386 or later CPU series and running the Microsoft Windows™ operating environment. The database program may use the Microsoft Access™ file format.

File transfer between computers may use a standard digital network. The Open Data Base Connectivity (ODBC) standard may be used to facilitate connection with other Sponsor or regulatory authority databases. The generation of the formatted documents may be by transfer of document-specific information to word processor templates including special field types created by the present invention; this approach allows the Authors to use their preferred word processor with all the normal functions of this word processor, together with special functions added by the present invention—for example, by providing a dynamic link library (DLL) provided as part of the invention.

Alternately, the documents may be generated by creating a Rich Text Format (RTF) file that can be utilized by any of the major computer word processors—in this alternative case, a visually appealing interface that may be written in Microsoft Visual Basic™ makes the system simple to use by Authors with limited computer knowledge. Communication of information between the relational data base and the word processor can be achieved by a separate component of the present invention, e.g., a set of C++ classes based on the Microsoft Visual C++™ computer program and the Microsoft Foundation Classes™. It is of course understandable that any other computer, database program, word processor or other software may be utilized to achieve the same functional results.

A preferred embodiment of the present invention creates sets of documents for Clinical Studies. In this embodiment (see FIG. 3), the Time/Action Electronic Matrix uses as the time axis the period during which the study staff and patients participate in the Clinical Study, and as the actions axis the patient evaluations, interventions or other actions taken by study staff or patients. A Clinical Study can be considered as a sequence of time points, each of which is associated with one or more required actions—such as determining if a patient meets entry criteria, what therapy or other interventions should be prescribed for the patient, or what patient evaluations or tests should be performed.

In the Clinical Research embodiment of the present invention (see FIG. 3), the Time/Action Electronic Matrix has each axis of the matrix divided into separate classes of time or action. The Time axis of the matrix is divided into various nested levels—Stages (Pre-Therapy, Therapy, Post-Therapy), Periods (functionally discrete components within a Stage), and Visits. The Action axis is also divided into nested levels—i.e., various Categories of Evaluation/Intervention (e.g., Dosing Groups, Entry/Retention Criteria, Efficacy, Safety, Pharmacokinetics, Other) and individual Items within a Category. The Time/Action Electronic Matrix provides a flexible and simple means of performing the initial outline phase of the Clinical Study design, and of driving the subsequent format and content of the Clinical Study documents.

The Flow Chart (see FIG. 6) is displayed on the computer screen or as a paper printout in the final document, and includes an array of cells by which a given measurement, intervention or other action to be performed in the Clinical Study is linked to a given time point during the study at which the evaluation or intervention will be performed. In FIG. 6, the column on the far left lists the evaluations or interventions to be performed in Clinical Study patients; and the upper rows represent the Stages of the Clinical Study (e.g., Pre-Therapy, Therapy, and Post-Therapy), the Periods within each Stage, and the timing of Visits within each Period. Special formatting is used for Visits at which one Period ends and the next Period begins so as to describe which of the measurements or interventions at that visit represent the Period just completed or the Period just beginning. A footnote dialog box on the computer screen provides a mechanism for specifying footnotes to be associated with a given cell.

EXAMPLE

An example of utilizing the method and system of the present invention is explained using the Protocol Document Listing I as an example of a generated Clinical Research document. The Flow Chart of FIG. 6 is a visual representation of the Time/Action Electronic Matrix of the document.

PROTOCOL DOCUMENT LISTING I

ABC DRUG COMPANY CLINICAL RESEARCH PROTOCOL
DOUBLE BLIND PARALLEL STUDY OF ZALOPINE AND PLACEBO IN PATIENTS WITH MILD HYPERTENSION RECEIVING ADJUNCTIVE HYDROCHLOROTHIAZIDE
PROTOCOL NUMBER: 011-33-234-123
STUDY DRUGS: Zalopine and Placebo
DOSAGE FORM: Tablets
INVESTIGATOR: Margaret Smith, MD
STUDY LOCATION: Cardiology Division, Hippocrates School of Medicine, 1500 Broad way , New York, N.Y. 10036
MEDICAL MONITOR: Donald Kemp, M. D., 212 573-1234 Associate Medical Director, ABC Drug Company
VERSION DATE: Aug. 25, 1995
I have reviewed this Protocol and I agree to conduct this study according to the Protocol requirements.
Investigator Signature: _____ Date: \_\_\_\_\_
This protocol is made available on a confidential basis to you and your staff in your capacity as an investigator or potential investigator for this clinical study. You may provide the protocol to your for the purpose of obtaining institutional approval to conduct the study. You may provide limited information to potential study patients, but only to the extent necessary for their participation in the study. The information must not be disclosed to others without written approval from ABC Drug Company.
Department of Clinical Research, ABC Drug Company, 235 East 76th Street, New York, N.Y. 10021.

I. SUMMARY

This study will be a 24-patient, 14-week, double blind, parallel comparison of zalopine and placebo in patients with mild hypertension. The Pre-Therapy Stage will have a 2-week washout Period and a 2-week single blind placebo run-in Period. The Therapy Stage will have an 8-week double blind Period. The Post-Therapy Stage will have a 2-week follow-up Period. All patients will receive adjunctive hydrochlorothiazide 50 mg qd. Patients will be assigned to zalopine or placebo in a 2:1 zalopine:placebo ratio. Zalopine dosage will be 5 mg.–20 mg qd. Efficacy (blood pressures), safety (Adverse Events and laboratory safety tests) and zalopine pharmacokinetics will be evaluated. Treatment groups will be analyzed for baseline comparability, and for differences between treatments in effects on blood pressure. Pharmacokinetic parameters will be AUC, Cmax, Tmax, and T ½. Descriptive statistics will be reported on other study variables.

II. OBJECTIVES (1) Determine the efficacy of zalopine in reducing blood pressure.

(2) Determine the safety and toleration of zalopine in short term therapy.

(3) Evaluate the pharmacokinetics of zalopine in a setting of adjunctive hydrochlorothiazide therapy.

III. NUMBER OF PATIENTS

A total of 24 evaluable patients will be recruited from two sites. The sample size is based on Power of 90%, $p<0.05$, and a detectable difference between treatment groups of 2 mmHg. Each site will recruit approximately 12 patients.

IV. DURATION OF STUDY

The Study Duration is the time from the screening Visit until the last follow-up Visit (i.e., Week 4 through Week 10) and will be 14 weeks for each patient. The duration of double blind therapy will be 8 weeks.

V. PATIENT SELECTION CRITERIA

A. Inclusion Criteria

1. Age

At least 18 years.

2. Gender

Males, or Females without childbearing potential (see Exclusions V.B.I. below).

3. Race/Ethnicity

Patients may be of any racial or ethnic background.

4. Primary Disease

Mild hypertension (Phase V diastolic BP 90–104 mmHg) documented on at least 2 occasions and for a duration of at least 3 months prior to the study.

5. Outpatient/Inpatient Status

Outpatients.

6. Screening History, Physical Examination and Laboratory testing

A medical history, physical examination, and laboratory safety screening (see Section VIII) must be performed prior to study entry.

7. Informed Consent

All patients must give written informed consent prior to study entry.

8. Blood Donation

Patients must agree not to donate blood during the study or for 30 days after the study.

9. Adjunctive therapy required by Protocol

Hydrochlorothiazide therapy must have been taken for at least 3 months prior to the study and dosage will be 50 mg/day throughout the study.

10. Other Inclusion criteria

None.

B. Exclusion Criteria

1. Childbearing potential/pregnancy/lactation

Females must not be of child bearing potential based on prior surgery, current use of IUD or cervical cap, or post-menopausal status. Lactating women must not enter the study. See Inclusions V.A.2. above.

2. Concurrent or Previous Medical or Surgical conditions

Significant hematologic, renal, hepatic or cardiac disease.

Systemic lupus erythematosis.

Hypokalemia (see V.B.4. below).

Systolic BP>180 mmHg.

3. History of Hypersensitivity or Lack of Toleration with Drugs in Study

History of hypersensitivity reactions or severe adverse reactions to zalopine or related drugs.

4. Abnormal Laboratory Test Results

Serum potassium<3.8 mEq/L.

5. Prohibited Drug Therapy

Beta blockers, ACE inhibitors, calcium channel blockers and other antihypertensive drugs are prohibited during the study, and for 30 days prior to the study. Other investigational drugs are prohibited during the study, and for 30 days before and after the study.

6. Prohibited Non-Drug Interventions

General anesthesia or hospitalization within 30 days prior to the study or anticipated need for these interventions during the study. Blood donation within 30 days prior to the study.

7. Inability to Give Informed Consent

Patients incapable of providing fully informed consent.

8. Other Exclusion Criteria

None.

VI. STUDY DESIGN

A. Methods

1. Design

This study will be a double blind, parallel comparison of zalopine and placebo in patients with mild hypertension. Patients will be titrated to maximum permitted dosage based on efficacy and safety findings.

The Protocol is divided into the following Stages, Periods and Visits:

| STAGE | PERIOD | PERIOD START/END | EVALUATION VISITS |
|---|---|---|---|
| Pre-Therapy (Pre Rx) | Screening/ Washout | Week −4/ Week −2 | Weeks −4, −2 |
| | SB Placebo Run-In | Week −2/Week 0 | Weeks −2, 0 |
| Therapy (Rx) | Double Blind | Week 0/Week 8 | Weeks 0, 1, 2, 4, 8 |
| Post-Therapy (Post Rx) | Follow-Up | Week 8/Week 10 | Week 10 |

Clinic Visits will be at Weeks −4, −2, 0, 1, 2, 4, 8 and 10. At the Week 8 Visit, patients will remain in the clinic for the 2, 4, 8 and 12 hours post-dosing blood pressures, in a room set aside for study patients; they may then return home and come back the following day for the 24 hours post-dosing pharmacokinetic and blood pressure evaluations. At the other Visits, patients will remain in the clinic until after the 2 hours post-dosing blood pressure evaluation.

The timing of study evaluations and treatments is shown in the flowchart in Appendix I.

2. Study Medication Instructions and Blinding Procedures

Instructions for medication handling and dispensing will be included with the shipment of the study medications to the Investigator (also see XII.B. below). The medications provided by ABC Drug Company will be the Study Drugs (zalopine and double blind placebo), run-in placebo medication, and adjunctive hydrochlorothiazide.

Tablets of zalopine and placebo will be identical in appearance. Patients will be assigned to treatment according to a computer-generated randomization list, with assignment to double blind medications being based on a 2:1 zalopine-:placebo ratio. Commercially available hydrochlorothiazide tablets will be used.

3. Premature Discontinuation from Study

The following will require discontinuation of an enrolled patient from further participation in the study.

(a) Adverse Effects or lack of efficacy that makes study continuation hazardous to the patient.

(b) Confirmed systolic BP>190 mmHg or diastolic BP >114 mmHg at any time during the study.

(c) Diastolic BP<90 mmHg at the end of the Pre-Therapy Stage (Week 0).

In such discontinued patients, all scheduled end-of-study evaluations will be performed, if clinically acceptable, prior to discontinuation or as soon after discontinuation as possible. The Investigator must document the reasons for discontinuation for each patient prematurely withdrawn from the study.

Should re-challenge with Study Drugs be considered desirable in such a patient, this action (together with any requirements for prior Institutional Review Board (IRB) approval or use of a special Informed Consent Form) must first be discussed and agreed upon with ABC Drug Company. No re-challenge is normally permissible in a patient with Serious Adverse Events during the study or who has shown evidence of hypersensitivity to a Study Drug.

B. Drug Administration

1. Timing of Therapy with Study Medications

Single blind placebo run-in medication will be taken from Week−2 to Week 0.

Patients will be on hydrochlorothiazide therapy at baseline and will continue this therapy during the study.

Double blind medication will be taken from Week 0 to Week 8.

2. Dosage of Study Medications

All study medications will be taken once daily at approximately 8 AM.

Single blind placebo therapy will be taken in fixed dosage of 1 tablet daily. Hydrochlorothiazide will be taken in fixed dosage of 50 mg daily.

Double blind therapy will begin at dosage of 1 tablet daily (placebo or zalopine 5 mg) and may be titrated upwards to a maximum dosage of 4 tablets daily (placebo or zalopine 20 mg). The maximum increment in dosage at any Visit will be 1 tablet daily. The minimum interval between dosage increments will be 1 week.

Double blind dosage titration will be based on blood pressure response and drug toleration. Dosage will not be increased if Goal blood pressure (reduction from Week 0 BP of at least 10 mmHg and to less than 90 mmHg, see section VII.A.) is achieved.

VII. EFFICACY

A. Clinical Efficacy

Blood Pressure

Blood pressure (BP) will be measured at each Visit. BPs will be evaluated 24 hours after the last dose at each Visit. Accordingly, patients will withhold study medications on the morning of a Visit, and will take their study medications the day prior to the Visit at the same time of day as the next day's Visit. For example, if a patient's next clinic appointment is for 11 AM on July 9, the patient will take study medications at 11 AM on July 8 and will postpone taking the 8 AM study medications on July 9.

At each Visit, BP will be taken within 15 minutes after arrival at the clinic. The day's normal study medications will then be administered to the patient and BP measured 2 hours after dosing. In addition, at Week 8 BP will be measured at 4, 8, 12 and 24 hours post dosing, 5 minutes before the corresponding pharmacokinetic blood sample is obtained. The exact times of dosing on the Visit day and on the day prior to the Visit, as well as the exact times of BP measurements will be recorded on the CRF.

BP will be measured after 5 minutes in the sitting position and after 2 minutes in the standing position using a mercury sphygmomanometer. Systolic and Phase V diastolic BP will be recorded to the nearest 2 mmHg.

If a patient reaches Goal BP no increase in dosage of study medications will be prescribed. Goal BP is defined as a reduction from Week 0 BP of at least 10 mmHg and to less than 90 mmHg.

B. Laboratory Efficacy

None.

VIII. SAFETY

A. Clinical Safety

1. Adverse Events

An Adverse Event (AE) is an undesirable medical event that (a) meets the definitions below and (b) has new onset or significant exacerbation either during the study (Week −4 to Week 10) or during the 30 days after the end of therapy with a Study Drug, whichever is later.

Adverse Events (AEs) will be evaluated at each Visit and all volunteered or observed AEs must be recorded.

Clinical AEs include Symptoms, Clinical Signs, Illnesses, Traumatic Injuries and Fatal Events. A clinical AE is not required to be associated with change in Study Drug dosage.

Laboratory AEs are Laboratory Test Abnormalities (regardless of any associated clinical findings) that result in change in Study Drug dosage for safety reasons.

All the above events are AEs regardless of whether or not they are considered to be causally related to Study Drugs. Medical terminology must be used in describing AEs. For fatal events, the event leading to death (and not "Death" itself) should be recorded as the AE.

2. Heart Rate

Heart Rate will be obtained immediately prior to each BP measurement (pre-dosing and 2 hours post-dosing at each Visit; in addition at the Week 8 Visit at 4, 8, 12 and 24 hours post dosing). Heart Rate will be recorded to the nearest beat per minute.

B. Laboratory Safety

1. Hematology, Blood Chemistry and Urinalysis

These parameters will be evaluated at the screening Visit (Week −4), Baseline (Week 0) and at the end of double blind therapy (Week 8). Fasting blood samples will be obtained. Tests to be performed will be Hematology (Hb, Hct, RBC, WBC and differential, platelet count), Blood Chemistry (BUN, creatinine, sodium, potassium, chloride, SGOT, SGPT, bilirubin, alkaline phosphatase, uric acid, total cholesterol, glucose, total protein, albumin, calcium, phosphorus), Urinalysis (SG; pH; chemical testing for albumin, blood and ketones; and microscopy for RBC, WBC and casts). Samples will be shipped to SciLab Inc. for analysis and reporting.

2. Non-Scheduled Laboratory Safety Tests

Results of additional non-scheduled laboratory safety tests must be reported in the Case Report Form (CRF) if the results of these tests significantly affect the patient's clinical assessment for study purposes.

3. Response to Hepatic Function Abnormality

For the purposes of the definitions below, the Upper Limit (UL) is defined as the higher of the following two values: (a) the upper limit of laboratory normal, (b) the pre-treatment baseline.

'Moderate Abnormality' of hepatic function:
$\geq 1.5\times$ UL for SGOT, SGPT or bilirubin, or
$\geq 1.2\times$ UL for alkaline phosphatase.

'Marked Abnormality' of hepatic function:
$\geq 3\times$ UL for SGOT, SGPT or bilirubin, or
$\geq 1.5\times$ UL for alkaline phosphatase.

Moderate Abnormality or Marked Abnormality will be confirmed by re-analysis of the sample.

Patients with Marked Abnormality will immediately discontinue the study. Liver function tests and additional evaluation as appropriate will be performed within 48 hours, and then at least at weekly intervals until the findings resolve or become stabilized.

Patients with Moderate Abnormality will have re-testing within 7 days and then at weekly intervals until the findings resolve or become stabilized.

C. Safety Reporting

1. Reporting Requirements for Adverse Events

All volunteered or observed AEs during the study (Week −4 to Week 10) regardless of suspected causality must be recorded in the appropriate section of the CRF. Completed CRF will be provided to ABC Drug Company on a regular basis. Each AE will be classified by the nature of the AE (medical terminology), time of onset, duration, severity, seriousness, any causal relationship to study medications, and such additional details as are clinically appropriate. Any Serious Adverse Event (SAE) must be reported to ABC Drug Company and to the IRB according to the procedure described in VIII.C.3. below. Any unexpected AEs must be reported to the IRB within 10 days, and documentation of the submission of this report provided to ABC Drug Company.

2. Severity Assessment of Adverse Events

The Severity of each AE (which is different from the Seriousness of the AE—see VIII.C.3. below) will be assessed according to the following definitions: Mild=Trivial and did not cause any real problem to the patient, Moderate=Problem to the patient but did not interfere significantly with daily activities or clinical status, Severe =Interfered significantly with the normal daily activities or clinical status of the patient.

3. Seriousness Assessment of Adverse Events

All AEs that are judged to be Serious (i.e., are 'SAEs'—see below) and that occur during the study, regardless of treatment group or causal relationship to drug, must be reported immediately by telephone to:

Donald Kemp, M. D., Associate Medical Director

Clinical Research Department, ABC Drug Company

Daytime Telephone: 212 573-1234

Nighttime/Emergency Telephone: 212 439-5678

A Serious Adverse Event (SAE) is any AE (including an intercurrent illness) that suggests a significant hazard to the patient, such as an AE that is:

(a) FATAL
(b) LIFE-THREATENING
(c) results in PERMANENT DISABILITY
(d) requires INPATIENT HOSPITALIZATION
(e) requires PROLONGATION OF A HOSPITAL STAY, or
(f) involves CANCER, CONGENITAL ANOMALY, or DRUG OVERDOSE AEs that occur after the study are not normally reportable. However, any AEs noted after a patient completes the study and that is both (1) Serious and (2) Possibly Causally Related to a Study Drug, must also be immediately reported. Note that, as specified in VIII.C. 1. above, all AEs during the study Stages must be reported regardless of causality.

The telephone report of an SAE must be followed up within five days by a written report to ABC Drug Company. The report must contain a full description of the event and of any sequelae apparent at that time. If significant additional sequelae are noted after this initial report, a subsequent report documenting the findings must be submitted to ABC Drug Company. In addition, any SAE (as well as any unexpected AE) must be reported to the IRB within ten days, and documentation of the submission of this report sent to ABC Drug Company.

IX. PHARMACOKINETICS

A. Plasma

Blood samples (4 ml.) for pharmacokinetic assay will be obtained at Week 0 (single sample) and at Week 8 (samples obtained prior to dosing and at 1, 2, 4, 8, 12 and 24 hours post double blind dosing). ABC Drug Company procedures for collection, storage, and shipping must be followed (see Appendix 2). Briefly, blood will be drawn into heparinized tubes, placed on ice, mixed with sodium fluoride (2.5 mg/ml of blood), centrifuged at 5° C., and 2 ml. plasma placed in shipping vials and frozen at −60° C. or lower until shipping. Self-adhesive labels will identify the study ID, patient ID, specimen type, and collection date and time. Plasma samples in patients assigned to zalopine therapy will be analyzed for zalopine concentrations.

X. RECORDING AND ANALYSIS OF RESULTS

A. Data Recording

All data required by the Protocol and any other significant findings in the patient must be promptly recorded on the ABC Drug Company CRF.

B. Data Analysis

Baseline demographic and other variables (including age, gender and race) will be analyzed to assess the comparability of treatment groups at the beginning of the randomization phase. Statistical significance testing will be 2-tailed and will be performed on the primary efficacy parameters (systolic BP and diastolic BP). Descriptive statistics will be reported on efficacy comparisons of age, gender and race subgroups, and on safety parameters. Pharmacokinetic data will be analyzed to determine AUC, Cmax, Tmax, and T ½. Both intent-to-treat and evaluable-patients analyses will be performed. There are no planned interim analyses.

XI. LOCATIONS OF LABORATORY TESTING

SciLab Inc.
1187 Hunter Plaza
Los Angeles
Calif. 90045

XII. GENERAL

A. Ethical and Legal Obligations

Each patient must sign an Informed Consent Form (ICF) approved by both the study Institutional Review Board (IRB) and by ABC Drug Company. In addition, an oral explanation must be given to the patient of the nature, duration and purpose of the study, and of any adverse consequences that might reasonably be anticipated from participation in the study. Patients must be informed that they are permitted to withdraw from the study at any time and for any reason without jeopardizing their future treatment. All personal information on patients must be kept confidential and patients shall be identified in study records (e.g., CRF) only by their initials and by a patient-specific identification number. The Investigator must keep a patient listing for cross referencing of the study records and the Source records (e.g., hospital, clinic, or laboratory records).

B. Study Materials

All study medications will be provided to the Investigator by ABC Drug Company. Packaging and dispensing information will be provided in separate instructions provided with the study medications. If the clinical condition of a patient makes it necessary to identify the nature of blinded medication, the study site staff must, whenever possible, first contact ABC Drug Company. In an emergency, it is acceptable for the study site staff to open the patient-specific sealed window of the code label. In such a case, ABC Drug Company must be promptly notified and a notation made in the CRF of the reason for breaking the blind study medications must be stored in a locked location with limited access. An accurate record of dispensing must be kept. Patients must be asked to bring all study medications with them at each Visit, and compliance assessment must be performed by the study site staff. All study medication containers (used and unused) must be returned to ABC Drug Company at the end of the study. The term 'Study Drug' refers to the primary drug being evaluated in a clinical study, as well as to any comparative agents used (such as active comparative agents, and randomized or parallel group placebos). Study Drugs do not include other study medications such as adjunctive drugs used in the study or placebo given as run-in or washout medication.

C. Study Monitoring and Auditing

ABC Drug Company staff will follow internal monitoring and auditing procedures. ABC Drug Company staff will visit the study site prior to study initiation, and also during the study and at the end of the study as required. The CRF and source documents will be reviewed for completeness and clarity, and will be compared for consistency.

D. Documentation and Use of Study Findings

Prior to the study the Investigator must supply ABC Drug Company with: (1) Signed FDA Form 1572, (2) Copy of IRB approval (including a copy of the IRB-approved ICF, IRB name and address, and occupations and affiliations of the IRB members), (3) Laboratory Certification and normal ranges (if laboratory assays are to be performed at the site), (4) Curriculum vitae of each Investigator, and (5) Signed Protocol cover page. CRF must be completed in black ink or typed (or, in cases of direct computer entry at the site, according to written instructions from ABC Drug Company). Any confidential information provided to the Investigator (such as patent status, chemical formulae, manufacturing process, basic scientific data and formulation data) must not be revealed by the Investigator without written consent from ABC Drug Company. The Investigator is obligated to provide any proposed publication, abstract or presentation materials to ABC Drug Company at least 30 days in advance of the intended presentation or of submission for publication.

E. Amendments to Protocol

The Protocol requirements must be closely followed. However, in cases of imminent hazard to a patient, the clinical management should be in the patient's best interests, regardless of Protocol requirements. All such cases should be discussed with ABC Drug Company as soon as possible to determine if the patient should remain in the study. Any Protocol amendment must be approved by ABC Drug Company prior to implementation at the study site.

F. Record Retention Requirements

The Investigator must retain copies of all CRF and of all source records related to the CRF information in a secure location. These records must be maintained for a minimum of two years following notification by ABC Drug Company of the discontinuation of investigational studies or that FDA has approved the NDA.

XIII. TELEPHONE NUMBERS OF KEY SPONSOR PERSONNEL

Daytime

Donald Kemp, M. D. 212 573-1234

Louisa Armstrong 212 573-5678

Thelma Monk 212 573-9012

Nighttime/Emergency 212 439-5678

The full data in the Time/Action Electronic Matrix is visually represented in the Flow Chart of FIG. 6. All the documents in the Document Set utilize the information in this matrix. As noted above, the Flow chart is displayed on the computer screen or as a paper printout in the final document. A footnote dialog box on the computer screen permits specific footnotes to be associated with a given cell which is the intersection of each time-point/action pair.

Reviewing the Clinical Research document example in Protocol Document Listing I above, the content of certain sections or subsections will be document-specific, although each company may make its own determination of which sections will be document-specific. Certain components will normally be common to all Protocol documents (e.g., section VIII A. 1., B.2–3, B.1–2, and C; X.A; XII; some components of the first page of the Protocol) and these, together with formatting information and assembly instructions, will be combined with document-specific information to provide composite files for use in displaying or printing documents.

The document-specific sections are to be transmitted within the same computer from the relational database to a mechanism (such as a computer word processor) for assembly of the composite files that will constitute the full document to be displayed or printed.

In addition, for transfer of documents between computers, all formatting and content common to all documents in the file set, file assembly instructions, and any required word processor computer program are first transmitted to all the receiving computers (such as Block 14 of FIG. 2) that will use the documents. Subsequently, document-specific sections can be transmitted (either as relational database files or as files stored in compact format) to such receiving computers, so that the receiving computer may assemble the composite files necessary for display or printing of the documents. Thus, the Document Transmitting Computer of Block 1 of FIG. 4 has a Block 2 representing formatting information, content and assembly instructions applicable to all documents of a particular document type, and transmits this information to a Document Receiving Computer in Block 6 of FIG. 4, which has a Block 7 which, on receipt of a document-specific file, will then be able to assemble the composite file to create the complete document. The same is true for the File Transmitting Computer of Block 1 of FIG. 5 which has a Block 2 representing formatting information, content and assembly instructions applicable to all files of a particular file type.

Thus, as seen from FIGS. 4 and 5 only the document-specific or file-specific content has to be transmitted to other computers. This can be done in condensed format as shown respectively in Block 4 of FIGS. 4 and 5. It is clear that condensation of a file follows well known computer principles, and such techniques need not be further described. It is evident that the elimination of the need to transfer, with each document or file, the information shared with all documents or files of that document or file type will result in substantial savings in data transmission time and data storage space.

The method and system according to the present invention provides a new and improved process and system for creating and electronically transmitting document files or other types of files that belong to file types that share formatting information or content among all files of the particular type.

Those skilled in the art will recognize that each company or other organization may use somewhat different document or file types and somewhat different document or file formats, all of which are supported by the present invention.

There has been disclosed heretofore the best embodiment of the invention presently contemplated. However, it is to be understood that various changes and modifications may be made thereto without departing from the spirit and scope of the present invention.

What is claimed is:

1. A method for electronically transferring, between at least two computers, electronic files belonging to a file set, the files of said file set each including a portion of common content and each including respective specific information, comprising the steps:

transferring between said computers a first electronic file containing said portion of common content, together with file assembly instructions, transferring between said computers at least one second electronic file containing only said specific information required for respective completion of each of said files in the file set, and assembling in accordance with said assembly instructions respective composite files at a receiving computer of said at least two computers by combining in each said composite file said portion of common content contained in the first electronic file, and said respective specific information required for respective completion of said composite file in the file set.

2. A method as claimed in claim 1 wherein the electronic files are of the file types used in a computer word processor or in relational database software.

3. A method as claimed in claim 2 wherein the electronic files include data of clinical research studies in humans.

4. A system for electronically transferring, between at least two computers, electronic files belonging to a file set, the files of said file set each including a portion of common content and each including respective specific information, comprising:

means for transferring between said computers a first electronic file containing said portion of common content together with file assembly instructions, means for transferring between said computers at least one second electronic file containing only said specific information required for respective completion of each of said files in the file set, and means for assembling in accordance with said assembly instructions respective composite files at a receiving computer of said at least two computers by combining in each said composite file said portion of common content contained in the first electronic file, and said respective specific information required for respective completion of said composite file in the file set.

5. A system as claimed in claim 4 wherein the electronic files are of the file types used in a computer word processor or in relational database software.

6. A system as claimed in claim 4 wherein the electronic files include data of clinical research studies in humans.

7. A method for generation of documents, comprising the steps of:

creating a time/action electronic matrix indicating a set of actions or tasks to be performed by one or more persons and a set of times at which each action will be performed, creating rules for using the time/action electronic matrix;

determining a set of documents to be generated in relation to said actions or tasks and a format and content for said set of documents using said set of rules, and generating said set of documents having said format and content in accordance with said rules and said electronic matrix.

8. A system for generation of documents, comprising:

means for creating a time/action electronic matrix indicating a set of actions or tasks to be performed by one or more persons and a set of times at which each action will be performed;

means for creating rules for using the time/action electronic matrix to determine a set of documents to be generated in relation to said actions or tasks and a format and content for said set of documents; and means for generating said set of documents having said format and content in accordance with said rules and said electronic matrix.

* * * * *